United States Patent [19]
Hayashi et al.

[11] 3,819,990
[45] June 25, 1974

[54] THIN-FILM CAPACITOR AND METHOD FOR THE FABRICATION THEREOF

[75] Inventors: Takeshi Hayashi; Masami Onuki, both of Kawasaki, Japan

[73] Assignee: Matsushita Electric Industrial Company, Limited, Kadoma City, Osaka, Japan

[22] Filed: Dec. 29, 1972

[21] Appl. No.: 319,189

[30] Foreign Application Priority Data
Dec. 29, 1971  Japan ............................. 47-262

[52] U.S. Cl. ............... 317/258, 29/25.42, 252/63.7
[51] Int. Cl. ............................................ H01g 3/075
[58] Field of Search .......... 317/258, 261; 29/25.42; 252/63.2

[56] References Cited
UNITED STATES PATENTS

| | | | |
|---|---|---|---|
| 2,932,591 | 4/1960 | Goodman | 317/258 UX |
| 3,124,478 | 3/1964 | Cirkler | 317/258 UX |
| 3,267,342 | 8/1966 | Pratt | 317/258 |
| 3,326,718 | 6/1967 | Dill | 317/261 X |
| 3,440,067 | 4/1969 | Fujiwara | 317/258 X |
| 3,568,014 | 3/1971 | Schuermeyer | 317/258 |
| 3,579,063 | 5/1971 | Wasa | 317/258 |

*Primary Examiner*—E. A. Goldberg

[57] ABSTRACT

A thin-film capacitor comprising a substrate plate, a dielectric layer, a first electrically conductive layer interposed between the substrate plate and one surface of the dielectric layer, and a second electrically conductive layer provided on the other surface of the dielectric layer. The dielectric layer is made of a mixture of a such as $Al_2O_3$, $Y_2O_5$, $TiO_2$, $SiO_2$, $Ta_2O_5$, $BaTiO_2$, $HfO$ or $NbO$ and a divalent metal oxide such as an oxide of Be, Mg, Ca, Sr, Ba or Ra. The dielectric layer is formed by depositing the mixture on a first aluminum electrode by an electron beam deposition method. In order to further improve the properties of the thin-film capacitor, the surface of the aluminum electrode may be oxidized and the dielectric may be annealed in an atmosphere of nitrogen. Furthermore, a protective layer which has the same composition as the dielectric may be deposited on the second electrode.

8 Claims, 7 Drawing Figures

THIN-FILM CAPACITOR AND METHOD FOR THE FABRICATION THEREOF

This invention relates to a capacitor, and more particularly to a thin-film capacitor using a metal oxide as a dielectric and also to a method for the fabrication thereof.

It is the common practice in the production of thin-film capacitors to use a dielectric of such material as silicon monoxide (SiO), cadmium sulfide (CdS), tantalum pentoxide ($Ta_2O_5$), aluminium oxide ($Al_2O_3$), magnesium fluoride (CaF), titanium dioxide ($TiO_2$), barium titanate ($BrTiO_3$), hafnium oxide ($HfO_2$), niobium monoxide NbO or the like. The dielectric is directly deposited on a substrate by a vacuum evaporation method, or a sputtering method to provide a thin dielectric film for use in a capacitor. The thin dielectric film may also be obtained by a method of depositing a metal on a substrate and anodizing the surface of the deposited metal into a metal oxide. However, these dielectrics in the form of thin films having a thickness of about 300 to 5,000 A are inferior to the original crystals or sintered materials thereof in properties, for example, in dielectric constant, temperature coefficient for capacitance, loss factor and current leakage.

For example, crystalline or sintered alumina has a loss coefficient smaller than 0.03%, but, on the other hand, when alumina is formed into a film, the loss coefficient becomes higher than 0.25% and the dependency of leakage current on temperature becomes higher.

In general, a dielectric in the form of a thin film shows different characteristics from the original crystal or sintered material thereof. That is, though the characteristics of the thin film dielectric are more or less influenced by a particular film-forming method used, impurities are easily introduced into the thin dielectric film during the production thereof, increasing leakage current due to electron conductivity of the impurities and thus causing undesirable temperature rises during operation of the capacitor.

In recent years, there is a tendency that the frequency level employed in communication instruments is gradually shifted to a higher frequency region, and accordingly it is strongly desired to hold the dielectric loss of a thin-film capacitor as low as possible.

It is therefore an object of the invention to provide a thin-film capacitor having a lower dielectric loss and small leakage current.

It is another object of the invention to provide thin-film capacitor which is suitable small in size and great in capacitance for use in a micro-intregrated circuit, It is still another object of the invention to provide a thin-film capacitor which allows production on a large scale.

It is another object of the invention to provide a thin-filmed capacitor including a thin-dielectric film which has a small temperature coefficient for capacitance.

It is another object of the invention to provide a thin-filmed capacitor, which has mechanical, thermal and electrical stabilities.

It is still another object of the invention to provide a method for producing a thin-film capacitor of the nature as mentioned above.

With the above objects in view, the present invention provides a thin-film capacitor comprising a substrate palte, a dielectric layer, a first electrically conductive layer interposed between the substrate plate and one surface of the dielectric layer in contacting relationship therewith, and a second electrically conductive layer provided on the other surface of the dielectric layer, the dielectric layer being made a mixture of a dielectric material such as $Al_2O_3$, $Y_2O_5$, $TiO_2$, $SiO_2$, $Ta_2O_5$, $BaTiO_2$, HfO or NbO and a divalent metal oxide such as an oxide of Be, Mg, Ca, Sr, Ba or Ra.

One feature of the invention resides in that the electron conductivity in the dielectric layer is reduced by admixing a divalent metal oxide with a dielectric material such as $Al_2O_3$, $Y_2O_5$, $TiO_2$, $SiO_2$, $Ta_2O_5$, $BaTiO_2$, HfO or NbO. This is because the divalent metal captures oxygen ions which generate in the oxide dielectric, and increases the electrical resistance of the dielectric. The loss factor, of a thin-film capacitor in a high frequency region is expressed by a formula $$\tan \delta = 1/Q = 1/2 \pi fCR$$

where Q is quality factor,
$f$ is frequency,
$C$ is capacitance, and
$R$ is resistance.

Thus, the dielectric loss can be made smaller by increasing the value of the resistance $R$.

Another feature of the present invention is that a thin-film dielectric is formed on a first electrically conductive layer or electrode by a electron beam deposition method, so that a crystallized or sintered dielectric material can be formed into a thin-film dielectric which has the same composition as the original dielectric material.

Still another feature of the present invention is that one surface of the first electrically conductive layer or first electrode of aluminium is thermally oxidized to form a crystallized aluminium oxide layer having a thickness of about 50 to 100 A. The provision of the aluminium oxide layer in the boundary between the first electrode and the dielectric layer permits easy crystallization of the dielectric.

A further feature of the invention is that an outer surface of the thin-film capacitor is protected by a layer of a material similar to the dielectric, so that the thin-film capacitor has a reduced current leakage and is protected from mechanical and chemical damages which would be imposed thereon from outside.

The foregoing and other objects and additional advantages of the present invention will be more fully understood from the ensuing description of the accompanying drawings, the latter serving for explanatory purposes only and are not intended to in any extent limit this invention, and in which drawings.

Figure 6:
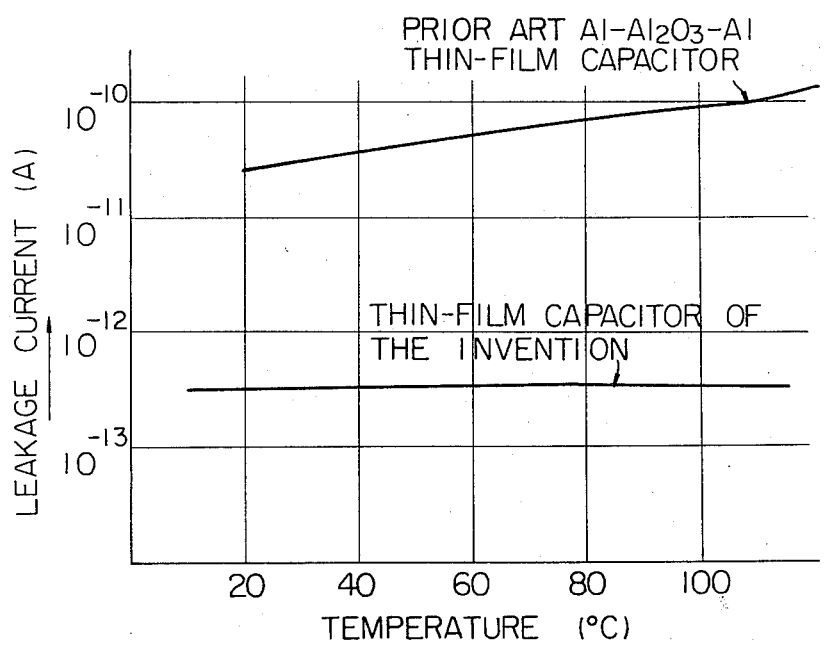
Figure 7:
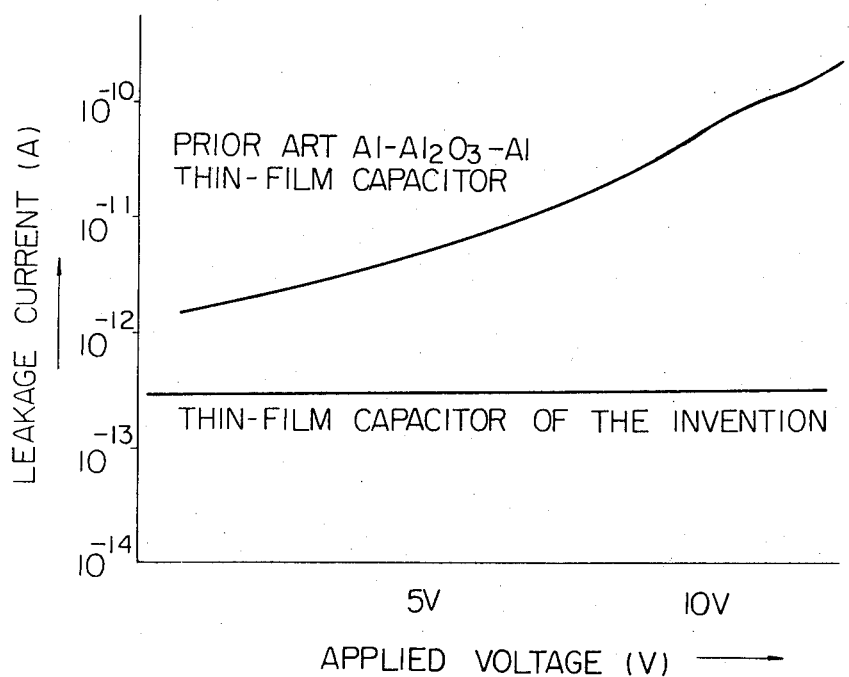

FIG. 6 is a graphical representation of the relationship between atmospheric temperatures and leakage current of the thin-film capacitor of the invention and of a prior capacitor using alumina as a dielectric; and FIG. 7 is a graphical representation of the relationship between leakage current and applied voltage of the thin-film capacitor of the invention and of a prior art capacitor using alumina as a dielectric.

In the accompanying drawings, like reference numerals are used to designate like parts throughout.

Figure 1:
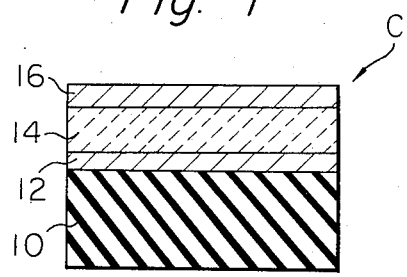
FIG. 1 is a diagrammatic sectional view of a thin-film capacitor embodying the invention.

Referring to FIG. 1 illustrating a first embodiment of our invention, a thin-film capacitor C comprises an electrically insulating substrate 10 made of a glass or ceramies on which deposited under vacuum is a first electrically conductive layer or electrode 12 having a thickness of 3,000 to 5,000 A and made of, for example, aluminium. A dielectric layer 14 is formed on the first electrode 12 on the aisw not contracting the substrate 10. On the dielectric layer 14, there is formed a second electrically conductive layer or electrode 16 similar to the first electrode 12. The dielectric layer is made of a mixture of a dielectric material such as $Al_2O_3$, $Y_2O_5$, $TiO_2$, $SiO_2$, $Ta_2O_5$, $BaTiO_2$, HfO or NbO and a divalent metal oxide such as an oxide of Be, Mg, Ca, Sr, Ba or Ra. The metal oxide: divalent metal oxide ratio by mole of the dielectric layer is varied depending on a combination of a dielectric material and a divalent metal oxide, particularly, $Al_2O_3$ and MgO are used as a dielectric material and a divalent metal respectively, an $Al_2O_3$: MgO ratio is preferred to be within a range of 1.5 to 3.3 : 1.

For example, when a mixture of $Al_2O_3$ and MgO having a mixing ratio with the range as defined above is formed into a thin-film dielectric having a thickness of 300 to 40,000 A, a thin-film capacitor using such dielectric film and having a structure as shown in FIG. 1 shows a specific dielectric constant of about 8,4 and a capacitance of 2,500 pF/mm$^2$ to 18 pF/mm$^2$.

In order to suitably deposit the dielectric layer 14 on the surface of the first electrode 12, it is required to pay a particular attention during the deposition process to the surfaces of the substrate 10 and of the first electrode 12 which is formed on the substrate 10. That is, it is preferred that the surface of the first electrode 12 contacting the dielectric layer 14 is of the same crystalline structure as the dielectric layer 14. Similarly, the substrate plate 10 should be smooth and pure, and is desired to have a crystalline structure or a lattice constant similar to that of the electrode material which is formed on the substrate plate.

Figure 2:
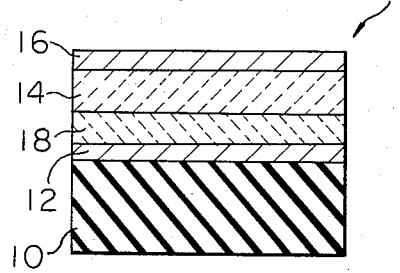
FIG. 2 is a diagrammatic sectional view showing a modified structure of the thin-film capacitor in accordance with the present invention.

FIG. 2 illustrates another embodiment of the present invention using an aluminium oxide-containing dielectric wherein the capacitor is further provided between the first electrode 12 mode of aluminium and the dielectric layer 14 with an aluminium oxide layer 18 having a thickness of 50 to 100 A.

The aluminium oxide layer 18 is formed by thermal oxidization of the first electrode 12 of aluminium. Accordingly, the surface of the first electrode has the same crystalline structure as the dielectric layer, so that the dielectric layer may be held in stable and intimate contact with the first electrode.

Figure 3:
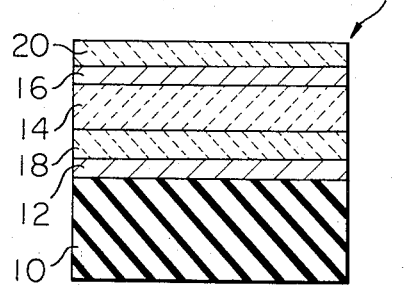
FIG. 3 is a diagrammatic sectional view of another modified structure of the thin-film capacitor in accordance with the present invention.

FIG. 3 shows still another embodiment of the present invention in which a protective layer 20 of the same material as the dielectric layer 14 is provided on the second electrode 16 in a thickness of about 3,000 to 50,000 A. A thin-film capacitor having such protective layer shows higher electrical, thermal and chemical stabilities. Where the dielectric material of the present invention is used as a protective material of the thin-film capacitor, the material functions to reduce the amount of current leaking from the surface and also gives a heat-insulating effect. Furthermore, such layer gives excellent protective or passivated effects on the thin-film capacitor in the boundary between the second electrode and the dielectric layer.

A preferred method for making the thin-film capacitor of the present invention will be described hereinafter.

The thin-film capacitor of FIG. 1 may be produced by: providing an insulating substrate plate; depositing under vacuum a first electrically conductive layer or electrode on the insulating substrate plate; forming a dielectric layer on the first electrode, said dielectric layer which is made of a mixture of a metal oxide such as $Al_2O_3$, $Y_2O_5$, $TiO_2$, $SiO_2$, $Ta_2O_5$, $BaTiO_2$, HfO or NbO and a divalent metal oxide and depositing under vacuum a second electrically-conductive layer or electrode on the dielectric layer. In this connection, it is preferred to form a dielectric layer which has the same composition as an original crystal or sintered dielectric material without introducing impurities during the film-forming process. This contributes to advantageously reduce the dielectric loss of the resultant thin-film capacitor. To comply with this, the dielectric material is preferably evaporated or deposited on the first electrode by an electron beam heating or depositing method. This method can be easily carried out without requiring complicated procedures for forming a stable thin layer of the dielectric material. For example, when aluminium oxide and magnesium oxide is used as a dielectric, 1 mole of magnesium oxide is mixed with 1.5 − 3.3 mole of aluminum oxide. Then, the resultant mixture is first crystallized into a crystal having a magnesium-alumina spinel crystalline structure, viz., MgO · $nAl_2O_3$ (n = 1.5 − 3.3) or is sintered, and then the resultant crystalline or sintered material is deposited on the first electrode by the use of an electron beam. The advantages of the electron beam deposition method reside in that the dielectric material is evaporated directly from the surface thereof, with the result that the finally obtained thin-film dielectric has the composition similar to or same as the originally crystallized material. Accordingly, it is necessary to determine the mixing ratio of $Al_2O_3$ to MgO to give a suitable thin dielectric layer.

Further, the first electrode made of a metal such as aluminium and formed in a thickness of 3,000 to 5,000 A may be subsequently treated in an atmosphere of oxygen at a temperature of 380° to 450° C for about 1 to 2 hours thereby to form on the surface of the first electrode an oxidized layer having a thickness of about 50 to 100 A which is smooth, pure and free from pinholes. The metal oxide layer obtained by the above process has a crystalline structure which is excellent in thermal, electrical and mechanical stabilities as compared with that formed by a direct vacuum deposition of $Al_2O_3$ (sapphire). The crystalline structure of the metal oxide layer is similar to or same as that of the thin-dielectric layer. It is preferred to provide such a stable layer in the boundary between the electrode and the dielectric as shown in FIG. 2 to obtain a thin-film capacitor of higher stability.

Figure 4:
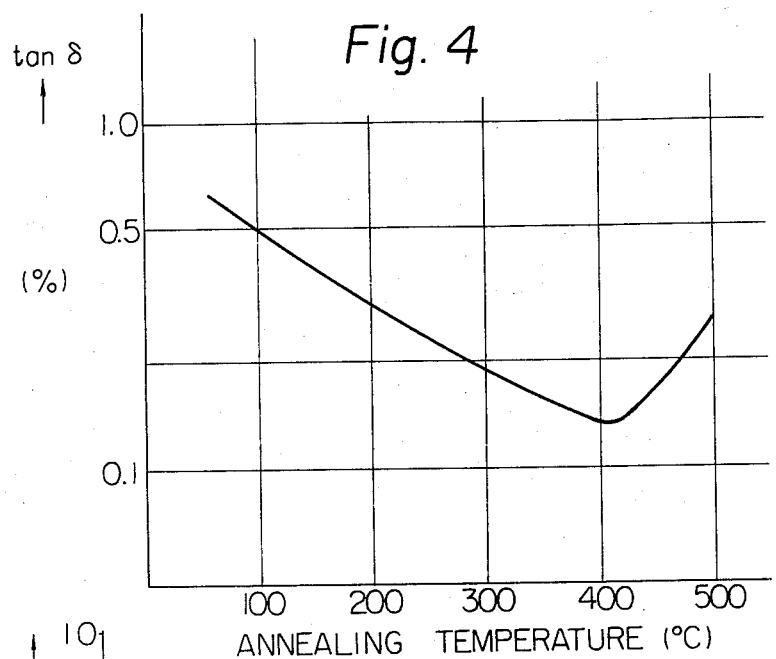
FIG. 4 is a graphical representation of the relationship between anealing temperature of the dielectric layer and dielectric loss of the thin-film capacitor of FIG. 2.

In order to stabilize the inside crystalline arrangement of the thin dielectric layer, the dielectric layer may be annealed in an atmosphere of nitrogen at a temperature of 380° to 450° C for about 1 to 2 hours after the forming step of the thin dielectric layer. By the annealing, a dielectrid loss (tan δ) is apparently reduced. The reduction of the dielectric loss by annealing is shown in FIG. 4 where the thin-film capacitor of the structure of FIG. 2 is used and tan δ is measured by applying a frequency of $10^6$Hz thereto.

The thin-film capacitor of FIG. 3 can be fabricated by the following steps: providing a substrate plate of glass or ceramics; depositing under vacuum a first electrically conductive layer or electrode such as of aluminium and having a thickness of 3,000 A or more on the substrate; leaving the resultant substrate in an atmosphere of oxygen at a temperature of 380° to 450° C for 1 to 2 hours to form an aluminium oxide layer of 50 to 100 A on the surface of the first electrode; forming a thin dielectric layer made of a mixture defined hereinbefore and having a thickness of 3,000 to 5,000 A by an electron beam deposition method; annealing the dielectric layer in an atmosphere of nitrogen at a temperature of 380° to 450° C for about 1 to 2 hours; depositing a second electrically conductive layer or electrode made of aluminium on the annealed dielectric layer in a thickness of 3,000 A or more; and depositing on the second electrode a protective layer of the same material as used in the dielectric layer.

Figure 5:
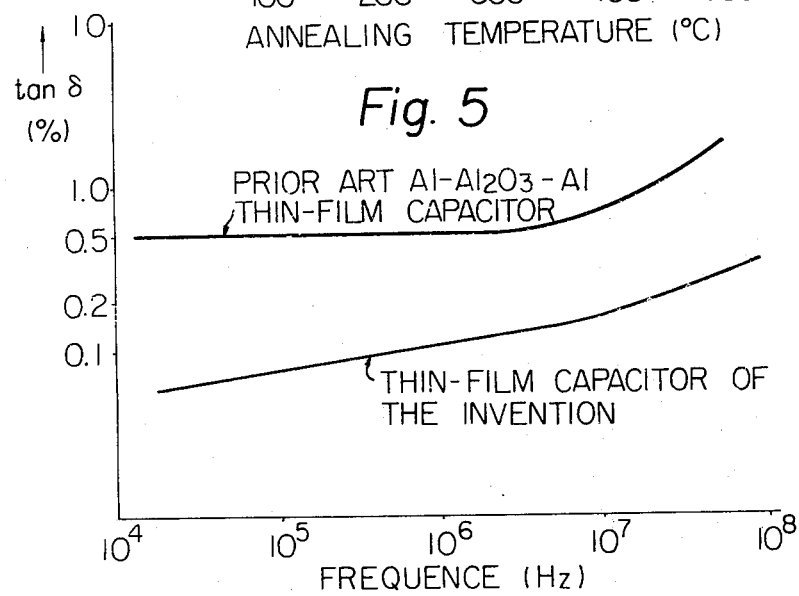
FIG. 5 is a graphical representation showing the relationship between frequency and tan δ of the thin-film capacitor of FIG. 3 side by side with that of a prior art capacitor using alumina as a dielectric.

In FIG. 5, the relationship between loss factor (tan δ) and frequency of the thin-film capacitor of FIG. 3 using $MgO \cdot 1.5Al_2O_3$ as a dielectric is shown in comparison with a prior art thin-film capacitor using aluminium oxide ($Al_2O_3$) as a dielectric, i.e., $Al$-$Al_2O_3$-$Al$ capacitor. From this, it is apparent that tan δ of the thin-film capacitor of the present invention is about 1/5 of that of the prior art product. Furthermore, the temperature coefficient for capacitance of the thin-film capacitor of the present invention is excellent as compared to the $Al$-$Al_2O_3$-$Al$ capacitor. The rate of change in capacitance of the prior art $Al$-$Al_2O_3$-$Al$ thin-film capacitor is as high as 300 ppm/° C while that of the thin-film capacitor of the present invention is only 150 ppm/° C.

In FIG. 6, there are shown in terms of temperature changes in leakage current amount which occur in the prior art thin-film capacitor and in the thin-film capacitor of FIG. 3 using $MgO \cdot 1.5Al_2O_3$ as a dielectric when 10V is applied thereto. This reveals that the thin-film capacitor of the present invention has a far excellent thermal stability.

In FIG. 7, there is shown the relationship between leakage current amount and applied voltage of the prior art $Al$-$Al_2O_3$-$Al$ thin-film capacitor and the thin-film capacitor of FIG. 3 using $MgO \cdot 1.5Al_2O_3$ as a dielectric of the present invention. The excellency of the capacitor of the present invention is clear as well.

While the present invention has been described with reference to particular embodiments thereof, it will be understood that the numerous modifications may be made by those skilled in the art without departing from the scope of the invention. Therefore, the appended claims are intended to cover all such equivalent variations as come within the true spirit and scope of the invention.

What is claimed is:

1. A thin-film capacitor comprising a substrate plate, a dielectric layer, a first electrically conductive layer interposed between said substrate plate and one surface of said dielectric layer in contacting relationship therewith, and a second electrically conductive layer provided on the other surface of said dielectric layer, said dielectric layer being made of a sintered mixture of a dielectric material selected from the group consisting of $Al_2O_3$, $Y_2O_5$, $TiO_2$, $SiO_2$, $Ta_2O_5$, $BaTiO_2$, $HfO$ and $NbO$ and a divalent metal oxide selected from a group consisting of oxides of Be, Mg, Ca, Sr, Ba and Ra.

2. A thin-film capacitor as claimed in claim 1, wherein said dielectric material is $Al_2O_3$ and said divalent metal oxide is MgO.

3. A thin-film capacitor as claimed in claim 2, wherein a ratio by mole of said $Al_2O_3$ to said MgO is within a range of 1.5 to 3.3 : 1.

4. A thin-film capacitor as claimed in claim 1, wherein said dielectric layer has a thickness of 300 to 4,000 A.

5. A thin-film capacitor as claimed in claim 1, further comprising a layer interposed between said first electrically conductive layer made of a metal and said dielectric layer, said layer being made of a metal oxide which is obtained by oxidizing said metal.

6. A thin-film capacitor as claimed in claim 5, wherein said metal is aluminum and said metal oxide is aluminium oxide.

7. A thin-film capacitor as claimed in claim 1, further comprising a protective layer of said mixture which is deposited on said second electrically conductive layer.

8. A method for fabricating a thin-film capacitor comprising the steps of:
   depositing under vacuum a first electrically conductive layer on a surface of an insulating substrate plate;
   oxidizing the surface of said first electrically conductive layer to form an oxidized layer thereon in an atmosphere of oxygen at a temperature of 380° to 450° C;
   sintering a mixture of a dielectric material selected from the group consisting of $Al_2O_3$, $Y_2O_5$, $TiO_2$, $SiO_2$, $Ta_2O_5$, $BaTiO_2$, $HfO$ and $NbO$, and a divalent metal oxide selected from the group consisting of the oxides of Be, Mg, Ca, Sr, Ba and Ra;
   depositing a dielectric layer of the sintered mixture on said oxidized layer;
   annealing said dielectric layer in an atmosphere of nitrogen at a temperature of 380° to 450° C; and
   depositing a second electrically conductive layer on said dielectric layer.

\* \* \* \* \*